United States Patent [19]

Wan et al.

[11] Patent Number: 4,678,770

[45] Date of Patent: * Jul. 7, 1987

[54] THREE-WAY CATALYST FOR LEAN EXHAUST SYSTEMS

[75] Inventors: Chung-Zong Wan, Somerset; Joseph C. Dettling, Howell; Kenneth I. Jagel, Stanton, all of N.J.

[73] Assignee: Engelhard Corporation, Menlo Park, N.J.

[*] Notice: The portion of the term of this patent subsequent to Jun. 23, 2004 has been disclaimed.

[21] Appl. No.: 842,746

[22] Filed: Mar. 17, 1986

Related U.S. Application Data

[63] Continuation of Ser. No. 696,950, Jan. 31, 1985, abandoned, which is a continuation-in-part of Ser. No. 620,415, Jun. 14, 1984, abandoned.

[51] Int. Cl.$^4$ .................. B01J 23/10; B01J 23/42; B01J 23/44; B01J 23/46
[52] U.S. Cl. .................. 502/304; 502/302; 423/213.5
[58] Field of Search .................. 502/302, 303, 304; 423/213.5

[56] References Cited

U.S. PATENT DOCUMENTS 3,993,572 11/1976 Hindin et al. .................. 502/304
4,157,316 6/1979 Thompson et al. .................. 502/304
4,448,895 5/1984 Ono et al. .................. 502/304

FOREIGN PATENT DOCUMENTS 2747373 8/1978 Fed. Rep. of Germany .
2217063 9/1974 France .
2329346 5/1977 France .
2403824 4/1979 France .

OTHER PUBLICATIONS

Summers et al., "Interaction of Cerium Oxide with Noble Metals", J. of Catalysis, 58, pp. 131–143 (1979).

Primary Examiner—W. J. Shine

[57] ABSTRACT

Three-way catalysts containing rhodium, rare earth oxide and platinum and/or palladium of improved durability, when subjected to exhaust gases containing excess oxygen, are formed, when the rhodium is segregated from the rare earth oxide, thereby preventing undesirable interactions between the rhodium and are earth oxide. The efficiency of the catalyst is optimized when the rhodium has an initial average particle size ranging from about 35 to about 80 Å in diameter.

60 Claims, No Drawings

THREE-WAY CATALYST FOR LEAN EXHAUST SYSTEMS

This is a continuation of co-pending application Ser. No. 06/696,950 filed on Jan. 31, 1985, now abandoned, which is a continuation-in-part of copending application Ser. No. 620,415 filed June 14, 1984, now abandoned.

Automotive exhausts have seriously contaminated the atmosphere, but vehicles equipped with three-way catalytic converters are virtually pollution-free, so long as they are properly operated. The three-way catalysts known to the prior art have exacted a penalty in the form of increased fuel consumption, as optimal pollution abatement and catalyst life precluded lean engine operation, which is known to provide increased fuel efficiency. Thus, a need has existed for catalysts which would allow the use of fuel-saving, lean mixtures, while providing effective pollution control without sacrificing catalyst life. In the prior art three-way catalysts rhodium, a rare earth oxide and a second platinum group metal have been dispersed on particles of alumina. We have discovered that it is undesirable to disperse the rare earth oxides and rhodium on the same particles of alumina, and thus, effective abatement of pollution from lean operating engines may be achieved using a catalyst which has rhodium, rare earth oxide and a second platinum group metal dispersed on particles of a high surface area refractory support, rhodium being dispersed on particles which are substantially free of the rate earth oxides. These catalysts are surprisingly durable when subjected to exhaust gases containing excess oxygen. We have also discovered that if the rhodium is applied in such a fashion the average initial particle size of rhodium crystallites dispersed on the gamma alumina exceeds about 30 Å (3.0 nm) an undesirable intersection between rhodium and gamma alumina can be reduced. Thus, even better abatement of pollution may be achieved with the catalyst of the present invention when the initial average particle size of the rhodium is at least about 30 Å in diameter.

The present invention thus relates, in general to improved catalytic compositions for controlling gaseous contaminants from the combustion of carbonaceous fuels and, in particular, to three-way catalysts having improved ability to convert unburned hydrocarbons, carbon monoxide and nitrogen oxides to less harmful forms in the presence of excess oxygen.

It is well known that when carbonaceous fuels are burned by conventional processes to produce power, for example, in reciprocating piston engines, rotary engines, turbines and the like, combustion is generally incomplete. The exhaust gases from these power producing systems contain a mixture of by-product pollutants including carbon monoxide, hydrocarbons (saturated and unsaturated) and oxides of nitrogen (often referred to as $NO_x$). Venting such exhaust gases to the atmosphere creates a serious air pollution problem. Elimination or substantial reduction of these undesirable by-products is thus seen to be extremely desirable.

The problem of substantially converting gaseous contaminants or pollutants in the exhaust gases of power producing systems to less harmful forms has been the subject of much research activity, especially in recent years. There are three principal gaseous pollutants which are of current interest, namely, unburned hydrocarbons, carbon monoxide and nitrogen oxides. Standards for all these components have been set by various governments which new automobiles are now required to meet. Until recently, adjustments to engine operating conditions have been sufficient to meet the standards. As these standards have become increasingly severe, it has been necessary to introduce new methods for removing or reducing the level of contaminants in the exhaust stream. Most recently, catalysts have been used to oxidize the unburned hydrocarbons and carbon monoxide. Removal of nitrogen oxides is accomplished by reducing the oxides to molecular nitrogen. Oxidation is accomplished by contacting the gases with oxygen in the presence of suitable catalysts. The catalysts are usually placed in the exhaust line leading from the combustion zone and serve to promote reaction between free oxygen and uncombusted and partially combusted fuel components. The oxygen is typically derived from either a fuel-lean operation of the combustion zone in which case it will be inherently present in the exhaust gas or from an external air or other oxygen supply. Combined with the oxidation catalyst in a single bed is a catalyst material that will selectively promote the reduction of nitrous oxides to nitrogen. Catalyst systems combined on a single bed which simultaneously promoted oxidation and reduction reactions to reduce the hydrocarbon, carbon monoxide and $NO_x$ content of exhaust gases are known to the art as three-way catalysts (TWC).

It has been determined that platinum-rhodium bimetallic and platinum-palladium-rhodium trimetallic compounds deposted on an alumina support are especially effective TWC's. Rhodium is of special interest since it is selective in the reducton of $NO_x$ into innocuous nitrogen in the presence of excess air in the exhaust supplied to the catalyst.

In practice, the catalyst systems are normally supported on relatively inert high surface area materials, usually of refractory metal oxide typically gamma alumina, so that the catalyst metals can be highly dispersed to obtain large active surfaces. The term, gamma alumina, is used herein in accordance with the common parlance in the catalyst industry to include high surface area admixtures, typically over 60 $m^2g$, preferably over 80 $m^2g$, consisting essentially of the gamma and delta phases of alumina but also possibly including substantial amounts of the eta, kappa and theta phases.

A common deficiency associated with supported catalyst systems is thermal degradation of the catalyst support from extended exposure to high exhaust gas temperatures of power producing systems. In a moving vehicle for example, exhaust temperatures can reach 1,000° C., and such elevated temperatures cause the support material to undergo a phase transition with accompanying volume shrinkage, especially in the presence of steam, whereby the catalytic metal becomes occluded in the shrunken support medium with a loss of exposed catalyst surface area and a corresponding decrease in activity.

A further deficiency with the TWC systems above described is the adverse effect on catalyst activity caused by the use in automobiles of high A/F ratios which cause greater than stoichiometric oxygen concentration in the exhaust gases. To achieve optimal simultaneous redox reactions with conventional TWC systems requires the A/F to be in the vicinity of stoichiometric. The use of high A/F ratios in automobile engines improves the fuel economy of the engine, but the presence of excess oxygen in the exhaust, referred to in the art as a "lean exhaust," reduces the activity of platinum group metal catalysts, as platinum is readily sintered at elevated temperatures in a lean exhaust atmosphere, thus reducing the available metal surface area of the catalyst.

Lean exhaust conditions also have a detrimental effect on the rhodium catalyst. In the Journal of Catalysis, Volume 50, pages 407-418 (December 1977) in an article entitled, "Surface Interaction in the System Rh/Al$_2$O$_3$," the authors report that rhodium interacts strongly with gamma alumina. Under lean exhaust conditions at elevated temperatures, rhodium interacts with and diffuses into the gamma alumina particles. Thus, exposure of gamma alumina supported rhodium containing TWC systems to lean exhaust conditions results in a reduction in activity believed to be due to a loss of rhodium accessibility to the exhaust system.

To achieve optimal simultaneous redox reactions in the exhaust using conventional catalysts, the A/F ratio must be in the vicinity of the stoichiometric A/F since the immediate vicinity of the stoichiometric A/F forms the TWC "window" where the catalyst efficiency is high for the conversion for all three, i.e., hydrocarbon, carbon monoxide and nitrous oxide, pollutants.

The art has devised various methods to improve the catalyst efficiency of Pt/Rh based TWC systems and widen the TWC window. For example, to reduce the rhodium-gamma alumina support interactions, the art has suggested substituting alpha alumina (U.S. Pat. No. 4,172,047) or zirconia (U.S. Pat. No. 4,233,189) as a support material which is not interactive with rhodium. However, alpha alumina and zirconia are relatively low surface area materials. During the operation of the power vehicle, various catalyst poisons such as lead, zinc and phosphorus are generated from the consumption of fuel and engine oil and deposit non-selectively on the active surfaces of the catalyst metals thereby reducing the available metal surface area of the metal catalyst. As the initial surface area of the TWC material is already low due to the use of the low surface area alpha alumina or zirconia, the deposition of the poisons may accelerate loss of activity by the TWC system to an unacceptable level. The advantage of reduced rhodium/support interaction is therefore offset by the lower initial surface area of the catalyst and further, during operation, the resulting exhaust accessible surface area of the catalyst is reduced by the poisons to a level lower than that encountered with conventional TWC systems supported on gamma alumina with the net effect that the low surface area TWC systems are not sufficiently poison tolerant. Thus, the present inventors have determined that an alpha alumina supported rhodium catalyst had inferior performance using a lead containing fuel after a 300 hour accelerated engine aging test as compared to a gamma alumina supported rhodium catalyst of equivalent concentration, the gamma alumina support catalyst producing 67% conversion of NO$_x$ as compared to 60% conversion obtained under comparable conditions with the alpha alumina supported rhodium catalyst.

Another method devised by the art, as represented by U.S. Pat. No. 3,993,572 and U.S. Pat. No. 4,157,316, to improve the catalyst efficiency of Pt/Rh based TWC systems is to incorporate a variety of metal oxides, e.g., rare earth metal oxides such as ceria and base metal oxides such as nickel oxides in the TWC system. Thus, in an article entitled "Three Way Catalyst Response to Transients" (Ind. Eng. Chem. Prod., Res. Dev. 1980, 19, 288-293) the authors, Schlatter et al. report that the operating environment of three-way catalysts is characterized by oscillations of the feed stream composition which occur with a frequency in the order of 1 Hz. It has been suggested that the incorporation of an "oxygen storage" component in the catalyst moderates the effects of the rapid changes between rich and lean exhaust stoichiometries. The authors question the validity of the conventional explanation that the storage component adsorbs excess oxygen during excursions on the lean side of the stoichiometric set point and releases it during subsequent excursions on the rich side, so that the stored oxygen is available for the removal of carbon monoxide and hydrocarbons present in the otherwise oxygen deficient system. Contrary to the findings of the present inventors that the interaction between ceria and rhodium is undesirable, the authors also suggest that the presence of cerium on the rhodium-impregnated spheres in a "fresh" three-way catalyst enhances the performance of the catalyst under transient or oscillating feedstream conditions by increasing either the amount or the stability of the oxidized rhodium species. In a later article, published in the same journal, entitled "Ceria-Promoted Three-Way Catalysts for Auto Emission Control" (Ind. Eng. Chem. Prod. Res. Dev. 1982, 21, 274-288) the author, Kim reports that ceria is the best non-noble metal oxide promoter for a typical Pt-Pd-Rh TWC supported on alumina catalyst largely because it enhances the water-gas shift reaction (CO+H$_2$O=CO$_2$+H$_2$) and possibly due, in part, to the additional oxygen storage it provides to the TWC.

As will hereinafter be demonstrated, it has been presently determined that, during extended use of the TWC under high temperature conditions, the rhodium metal present in a rare earth promoted TWC on alumina catalyst interacts with the rare earth metal thereby aggravating the deleterious effect on catalyst activity already noted with gamma alumina.

What has been needed, but has neither been available or recognized in the art, is a TWC system in which the active surface areas of the metal catalyst components are maintained by reducing the interaction of rhodium with the support and any rare earth present either as a promoter or stabilizer so that the TWC window is widened to accommodate lean exhaust conditions in order that catalyst efficiencies remain high over the required life of the catalyst.

SUMMARY OF THE INVENTION

In accordance with the present invention, there is provided a three-way catalyst system suitable for simultaneously oxidizing hydrocarbons and carbon monoxide and reducing nitrogen oxides in the exhaust gases of power vehicles and, in particular, for internal combustion engines, which catalyst system contains a rhodium metal catalyst dispersed on an alumina support wherein interaction of the metal with the support and/or metal oxide oxidation promoters present in the catalyst system is reduced with the result that the catalyst system is more tolerant of lean exhaust conditions. In the catalyst system of the present invention, the catalyst is comprised of a platinum metal group component selected from rhodium and at least one second component of platinum, palladium or mixtures thereof, and a high surface area support material such as gamma alumina and a rare earth oxide, a substantial portion of the rhodium being deposited on separate particles of support materials, which are substantially free of rare earth oxides. Preferably, the rhodium particles have an initial average particle size greater than 30 Å whereby interaction of the rhodium with the support is further reduced.

The catalyst is prepared by forming at least two different types of particles. The first type of particle comprises rhodium and, optionally, platinum and/or palladium, dispersed on high surface area alumina, which is substantially free of rare earth oxides. The second type of particle comprises platinum and/or palladium, dispersed on high surface area alumina, which may optionally include rare earth oxides either as a stabilizer incorporated in the alumina or as an active species, dispersed on the particle surface. If desired, particles of a third type, comprising a bulk rare earth oxide, optionally coated with platinum and/or palladium, may also be formed. Particles of these types are combined to form a catalytic composition, containing rhodium, a rare earth oxide, alumina and platinum and/or palladium, which may then be deposited on a monolithic substrate or other carrier to form the catalyst. As used herein, the term "rare earth oxide free particles" should be understood to mean particles having less than about 0.5% rare earth oxide by weight contained therein or dispersed on the surface thereof.

As will hereinafter be demonstrated, segregating the rhodium from the rare earth oxide in a TWC results in a catalyst exhibiting a substantial increase in catalyst efficiency, under lean exhaust conditions, as represented by the conversion of the hydrocarbon, carbon monoxide and nitrogen oxides to innocuous gases, the segregation of the rhodium reducing its interaction with the support and rare earth oxide promoters present in the TWC system. It will hereinafter be further demonstrated that the degree of undesirable interaction between the alumina support and the rhodium is significantly reduced by dispersing the rhodium in such a fashion that the crystallites have an initial average particle size of at least 30 Å on the rare earth metal free alumina support and thus even further improvements in catalyst efficiency are attained under lean exhaust conditions.

DETAILED DESCRIPTION OF THE INVENTION

The catalysts of the present invention can be prepared as confined batches or beds of catalytically coated particulates which, in turn, may be generally spherical or of small pellet form, with nominal diameters and lengths in the 1/16 inch to 5/16 inch range. Preferaby, however, the catalysts of the present invention can be manufactured and supplied as catalytically coated rigid skeletal monoliths, or honeycomb elements where there are a multiplicity of longitudinal passageways or cells in each unit in order to provide a large nominal surface area.

The spheres and pellets are of advantage as catalyst support material to the extent that they can be made from refractory inorganic oxides, typically of alumina, or of alumina with one or more other oxides as additives to help stabilize for strength, heat resistance, etc., such that they have surfaces with resulting high porosity and large resulting actual surface areas. On the other hand, pills and pellets are far more fragile than rigid, monolithic honeycomb elements and are more easily broken when placed in service on an auto or truck. Small spheres or pellets are especially subject to exhaust gas pulsations from the engine operation such that a breakage rate can be quite high for loosely packed beds of these rather fragile members. Rigid monolithic, honeycomb structures are typically made from "ceramics" which comprise refractory crystalline materials such as sillimanite, magnesium silicates, zircon, petalite, spodumene, cordierite, aluminosilicates, mullite, or combinations thereof, etc. Such materials, which are of varying compositions of silica, magnesia and alumina, are considered to have surface porosity; however, as heretofore noted, their surfaces are not highly porous to the same extent as obtained with a lower bulk density alumina pill or extrudate and, therefore, the individual catalyst metal compounds are impregnated on high surface area alumina and then coated on to the monolithic structure.

The manner in which the rhodium and other platinum group metals are deposited on alumina support particles, forms the critical features of the present invention: Particles bearing rhodium (and optionally platinum and/or palladium as well) are substantially free of rare earth oxides, while particles having rare earth oxides associated therewith (as stabilizers, as promoters, or as the principal constituent of the bulk phase) may be impregnated with platinum and/or palladium. Thus, in preparing the catalyst materials of the present invention, a rhodium compound (optionally also containing platinum and/or palladium) is impregnated on support particles, preferably gamma alumina, which are substantially free of rare earth oxides and a second platinum group metal compound such as platinum and/or palladium may be impregnated on either separate alumina particles which may have rare earth oxides associated therewith or rare earth oxide particles, such as ceria or both. After separate impregnation of the support particles, the separately impregnated support particles and optional rare earth oxide particles may be compacted and formed into pellets or spheres ready for use as catalysts for the conversion of pollutants in the exhaust gases of power vehicles. Alternatively, and preferably, the various particles are combined in a liquid medium such as water to provide a slurry which may be applied to a monolithic substrate as a washcoat. Thereafter the washcoated monolith is calcined to drive therefrom the liquid medium of the slurry and to leave on the monolith a dry, adherent coating comprised of rare earth free rhodium bearing support particles (optionally also bearing platinum and/or palladium) and rare earth containing particles, segregated from the rhodium bearing particles, but optionally bearing platinum and/or palladium dispersed thereon, the combined weight of platinum and palladium being at least twice the weight of the rhodium.

The quantity of rhodium and second platinum group metal component included in the TWC system depends first on design requirements such as activity and required life and second on economics. Theoretically, the maximum amount of each component is enough to cover the maximum amount of surface available without causing undue metal crystallite growth and loss of activity during use. Thus, with respect to rhodium metal catalysts, several competing phenomenon are involved. Large particle size rhodium metal, greater than 100 Angstroms (10 nm) exhibits less interaction with the alumina support but is more susceptible to loss of activity due to exhaust poisons. Adjacent crystallites of poorly dispersed rhodium are susceptible to sintering which decreases the surface area of the available catalyst with greatly reduced catalyst activity even though interaction with the support is reduced. Smaller particle size rhodium metal, crystallites, e.g. less than 20 Angstroms diameter tend to interact more strongly with the alumina support reducing catalytic activity. This interaction can be reduced by dispersing the rhodium in such a fashion that the average particle size of the rhodium crystallites is at least about 30 Å (3.0 nm).

Therefore, the initial average particle size of the rhodium compounds with which the support particles are impregnated forms an important feature of the present invention. Generally, the rhodium particles should range from about 20 to about 100 Å in diameter. To obtain high activity maintenance and resistance to poisons, it is greater than about 2 nm, preferable advantageous for the initial average particle size to be less than 50 Å. As will hereinafter be demonstrated, rhodium particles of about 30 to about 100 Angstrom units in size, and preferably about 35 to about 85 Angstrom units diameter are less susceptible to interaction with the alumina support and TWC catalysts prepared using such particle size rhodium exhibit higher catalytic efficiencies. It is especially advantageous to disperse the rhodium in such a fashion that the average particle size is between about 35 and 50 Å so that undesirable interaction with the support is reduced and resistance to poisoning is maintained. The particle size of the second platinum group metal is preferably less than about 25 Angstroms to ensure high activitiy and property dispersion.

An used herein, the weighted average particle size $d_v$ is that determined by chemisorption and for j particles mathematically may be conceptualized as $$d_v = \frac{\sum_{i=1}^{j} n_i d_i^3}{\sum_{i=1}^{j} n_i d_i^2}$$

The average particle size, $d_n$, is that obtained by analysis of transmission electron micrographs and for j particles may be conceptualized mathematically as $$d_n = \frac{\sum_{i=1}^{j} n_i d_i}{\sum_{i=1}^{j} n_i}$$

where $n_i$ is the number of particles having a particle size of $d_i$.

To prepare rhodium compounds of a particle size in the range of about 30 to about 100 Angstrom units containing dispersed alumina particles and a water soluble rhodium compound such as rhodium chloride or rhodium nitrate is prepared in the conventional manner as by comminuting the alumina and rhodium compounds admixed with a sufficient amount of liquids, e.g. water, so that the liquid is in a continuous phase in the mixture, i.e. the mixture is a slurry. The comminution is advantageously accomplished in a ball mill or other suitable equipment, the slurry being comprised of about 20 to about 55% by weight alumina, 0.05 to abot 2.0% by weight of the rhodium compound, with the balance 50 to about 75% by weight water.

The slurry is then treated to fix the rhodium metal on the alumina particles dispersed in the slurry. Fixing may be accomplished in a variety of ways such as by treatment with a gas such as hydrogen sulfide, NaBH$_4$, hot formic acid, hydrogen at elevated temperature, hydrogen sulfide treatment being preferred.

When hydrogen sulfide is used as the fixing agent, the gas is simply bubbled through the slurry, the amount of hydrogen sulfide being from about 2 to about 30 moles of hydrogen sulfide per mole of rhodium metal treated. Thereafter, the separately impregnated second platinum group alumina particles and/or rare earth particles may be combined with the separately impregnated fixed rhodium/alumina particles to form a washcoat which may be applied to a monolithic support in the manner described herein.

Economics, of course, dictate the use of the least amount of rhodium and second platinum group metal component possible while accomplishing the main objective of reducing pollutants. Further, since the amount of platinum and palladium occurring in many of the currently mined ores is greatly in excess of the amount of the rhodium contained therein, it is desirable to insure that the rhodium applied to the catalyst is utilized effectively and to minimize the amount of rhodium applied as compared to the more plentiful platinum and palladium. In catalysts of this invention, the combined weight of platinum and palladium present is in excess of twice the weight of rhodium. Preferably, the combined weight of platinum and palladium is at least four times that of rhodium. In the preferred embodiments, the combined weight of the platinum and palladium exceeds that of rhodium by a factor of at least about 5. In the more preferred embodiments, the combined weight of the palladium and platinum exceeds that of rhodium by a factor of at least about 10. Generally, the amount of catalyst metal used is a minor portion of the TWC system and typically does not exceed about 10 weight percent of the support material exclusive of the substrate. The amount may be about 0.01 to 8% and is preferably about 0.05 to 5% to economically maintain good activity with prolonged use. For use in automobile exhaust converters, the catalyst will generally be comprised of about 0.25 g/in$^3$ to about 4.0 g/in$^3$ alumina, preferably about 0.5 g/in$^3$ to about 3.0 g/in$^3$ alumina, about 0.05 g/ft$^3$ to about 25 g/ft$^3$ rhodium, preferably about 0.1 g/ft$^3$ to about 15 g/ft$^3$ rhodium and about 0.5 g/ft$^3$ to about 150 g/ft$^3$ of the second platinum group metal and preferably about 1 g/ft$^3$ to about 90 g/ft$^3$ by weight of the second platinum group metal.

During preparation of the catalyst, various compounds and/or complexes as well as elemental dispersions of any of the rhodium and second platinum group metals may be used to achieve deposition of the metal on the support particles. Water soluble compounds or complexes, as well as organic soluble compounds or complexes, may be used. The only limitation on the liquids to deposit these compounds, complexes, or elemental dispersions is that the liquids should not react with the metal compound and must be capable of being removed from the catalyst by volatilization or decomposition by subsequent heating and/or vacuum. It is not critical whether this removal is accomplished as part of the preparation or during the initial use of the completed catalyst. Suitable compounds are, for example, chloroplatinic acid, potassium platinum chloride, ammonium platinum thiocynate, amine solubilized platinum hydroxide, rhodium chlorides, oxides, sulfides, nitrates, hexamine rhodium chloride and similar soluble decomposeable compounds.

If a mixture of platinum and palladium is desired as the second platinum group metal component, the platinum and palladium may be in water soluble form, for example, as amine hydroxides or as chloroplatinic acid and palladium nitrate or palladium chloride, when used in preparing the catalysts of the present invention. Whatever the type of metal compound used during subsequent calcination or use, essentially all of the metal will be converted to the catalytically active form.

The catalyst support materials used in the practice of this invention may contain forms of higher surface area alumina. The higher surface area aluminas include gamma, eta, kappa, theta and delta phases, preferably having surface areas over 80 $m^2/g$, as distinguished from relatively lower surface boehmite and alpha phase of alumina. Although the maximum amount of rare earth oxide which may be present in the support particles bearing rhodium is difficult to define precisely, it is clear that 1% by weight will lead to undesirable interactions between the rare earth oxide and rhodium. Therefore, the maximum amount of rare earth oxide present in rhodium bearing particles should be less than 1%, preferably less than 0.5%, more preferably less than 0.1% and still more preferably less than 0.01%.

If desired, a stabilizer such as a rare earth oxide, silicon dioxide, zirconia, or an alkaline earth oxide may be admixed or combined with the alumina support material. Thus, the presence of these oxide stabilizers retards the phase transition of higher surface area alumina to alpha alumina so that occlusion of the metal catalyst and resultant decreased catalystic activity is avoided. The amount of metal oxide combined with the alumina is about 0.05 to 30 weight percent, preferably about 0.1 to 25 weight percent, based on the composite weight. Among the alkaline earth metal oxides which may be used to stabilize alumina are those of barium, strontium, calcium and magnesium. The amount used in preferably from about 0.1 to about 3.0 percent based on the combined weight of the alumina and alkaline earth oxide. Among the rare earth oxides which may be employed in the catalyst are those of cerium, lanthanum, neodymium, praseodymium, as well as commercially available mixtures of rare earths. The rare earth oxide is preferably cerium, or cerium oxide (ceria). If a mixture of rare earths is used, the mixture is preferably one in which cerium or cerium oxide is the predominant component.

It is advantageous to include a substantial portion of ceria in bulk form to promote oxidation and reduction reactions. The catalysts may also contain other ingredients which may serve as additional promoters for oxidation and reduction reactions, e.g. manganese, vanadium, copper, iron, cobalt, chromium, zirconium, nickel, and the like. Such promoters include the various metal oxides and other compounds of the metals which can be converted into oxides under operating conditions. Promoters are generally incorporated in the washcoat support at concentrations ranging from about 0.05 to about 50% by weight and preferably from about 0.5 to about 25% by weight of the washcoat support.

Although the use of rate earth oxides are effective in providing stability to phase transition to gamma alumina, it has been determined, and will hereinafter be further demonstrated, that the incorporation of rare earth oxides, and specifically ceria in gamma alumina, deleteriously affects the catalytic activity of rhodium metal and, therefore, in the preparation of the TWC compositions of the present invention, rare earth oxides should not be incorporated in the alumina support particles upon which the rhodium metal compound is impregnated or dispersed. On the other hand, whether a rare earth oxide such as ceria is incorporated into the alumina support particles upon which the second platinum group metal compound is impregnated or dispersed or is included as a physical mixture upon which the second platinum group metal may optionally be dispersed, the catalytic conversion of hydrocarbon and carbon monoxide pollutants is beneficially affected by the presence thereof. As has already been noted, ceria is also thought by some to serve as an oxygen storage component in the catalyst to effectively moderate the effects of the rapid changes between rich and lean exhaust stoichiometries. The effect of incorporating rare earth oxides, particularly ceria, is especially pronounced on oxidation of carbon monoxide. An amount of ceria as small as 0.5% by weight of the washcoat can result in a significant decrease in the amount of unconverted carbon monoxide. Preferably, the catalyst composition of the present invention will include at least abut 3%, more preferably 5%, and still more preferably 10%, by weight of rare earth oxide. The most preferred catalysts of the present invention will include at least 15% by weight of rare earth oxide, preferably ceria.

However, as mentioned, even though rare earth oxides enhance oxidation of carbon monoxide, the interaction between the rare earth oxides and rhodium is undesirable.

The incorporation of rare earth oxides such as ceria in the alumina used for the support of rhodium catalysts should therefore be avoided and other metal oxide stabilizers such as the alkaline earth metal oxides and particularly barium oxide used in place of these rare earth metal compounds. Barium oxide is the preferred stabilizer for gamma alumina particles having rhodium disposed thereupon.

The catalysts of the present invention are particularly suitable for the reduction of hydrocarbon, carbon monoxide and nitrogen oxide pollutants in the exhaust gas from an internal combustion engine. In such applications, it has been concluded that a monolithic ceramic support should preferably be used rather than pelleted type supports. The pellets are slow to heat up and after being exposed to high temperatures to cyclic oxidation and reduction conditions, they tend to lose their strength, crumble and break apart. The ceramic monolithic supports, in contrast, heat up quickly, and are tough, being able to withstand the severe conditions in the emissions converter. To have good activity, it appears that the surface area of the completed monolithic catalyst should have a minimum of 5 $m^2/g$. To achieve this, an aqueous washcoat comprising a mixture of substantially rare earth oxide free alumina particles having rhodium and, optionally platinum and/or palladium dispersed thereupon, the weight of platinum and palladium present being at least twice the weight of rhodium present, is applied to the monolith by any conventional means such as by immersing the monolith in the slurry. The monolith is then drained of excess slurry and then blown with air to remove excess coating slurry and open any plugged passageways.

The solids content of the slurry forms a deposit on the monolith, and the resulting composite is dried and calcined to provide a catalytically active product. The drying and calcination take place at a temperature low enough to prevent undue sintering of the mixture. Calcining may be accomplished by the initial use of the TWC or in a separate step which promotes adhesion of the supported metal catalyst to the carrier substrate thus allowing the use of the carrier in high space velocity exhaust gas environments without substantial erosion of the deposited catalytst.

The present invention is illustrated by the Examples which follow:

EXAMPLE I

Catalyst I

A platinum-rhodium alumina supported TWC system was prepared in accordance with the present invention as follows:

One kilogram of gamma alumina powder (stabilized with 0.8% by weight of barium oxide), having a surface area of 130 m$^2$/g, was impregnated with an amine solubilize aqueous platinum hydroxide (H$_2$Pt(OH)$_6$) solution containing 13.8 grams of platinum. The particle size of the platinum containing alumina was then reduced by ballmilling with water and acetic acid to form a slurry.

In a separate operation, 1000 grams of substantially rare earth oxide free gamma alumina (surface area 130 m$^2$/g) stabilized with 0.8% by weight barium oxide was impregnated with aqueous rhodium chloride solution containing 2.76 grams of rhodium. A slurry was formed by ballmilling the rhodium impregnated alumina in water and acetic acid. The rhodium was fixed with hydrogen sulfide at room temperature, the resulting rhodium having a weighted average particle size of 25 to 30 Å diameter as determined by CO chemisorption.

In addition, 571 grams of bulk ceria (surface area 120 m$^2$/g) was ball milled in water to form a slurry, which was subsequently mixed with the platinum and rhodium containing slurries to form a washcoat slurry. A monolithic support of cordierite containing about 400 flow passages per square inch of cross-section was dipped into the washcoat slurry. The excess was blown off the monolith by compressed air, and the monolith was dried to remove free water and calcined at 500° C. for 20 minutes to provide a 20 g/ft$^3$ platinum group metal loading on the monolith with a 5:1 Pt/Rh ratio, two such monoliths having a total volume of 170 in$^3$ are fitted into a canister to form a TWC having a metal content of 0.0526 Troy ounce platinum and 0.0105 Troy ounce rhodium.

Catalyst II (Comparative TWC)

For purposes of contrast, a commercially available Pt-Rh TWC catalyst of a composition similar to that of Example I except that the rhodium was dispersed on ceria containing particles was obtained having a 20 g/ft$^3$ platinum group metal loading. As in Example I, the total volume of the catalyst in the converter was 170 in$^3$ having a 5:1 Pt/Rh ratio composed of 0.0526 Troy ounces of platinum and 0.0105 ounces of rhodium. It was noted that ceria was evenly dispersed over the surface of the monolith and was not segregated from the rhodium thereon.

Each of the catalyst coated monolith bodies above was mounted in the exhaust stream of a laboratory test automobile engine, and aged in an engine load aging cycle for 500 hours at +0.3 air to fuel ratio units wherein an A/F of 14.65 is taken as a base line of unit zero. An A/F of +0.3 corresponds to an A/F of 14.95. During aging, the air to fuel ratio in the fuel to the engine was varied so that the catalyst was exposed to an inlet temperature of about 593° C. for 98% of the time and 703° C. for 2% of the time. In each case, the engine utilized for the aging burned a normal hydrocarbon gasoline fuel with a lead content of about 0.005 grams of lead per gallon of fuel (g/gal) and then tested for utilization as a TWC catalyst, i.e., used to catalyze the substantially simultaneous oxidation of carbon monoxide and unburnt hydrocarbons and reduction of nitrogen oxides.

After aging, the two TWC converters were evaluated on an engine dynamometer wherein the air-to-fuel ratio employed was fluctuated ±0.5 air-to-fuel units about the stoichiometric base line or set point at 1.0 Hz perturbations. The evaluations were performed at 550° C. (inlet temperature) and an exhaust gas flow rate of 65,000 volumes of gas per volume of catalyst per hour, (VHSV). The catalytic efficiency at the above described conditions is summarized in Table I below. The results recorded in Table I show the amount of hydrocarbons ("HC"), carbon monoxide ("CO") and nitrogen oxides ("NO$_x$") which were removed.

TABLE I

Conversion Efficiency of TWC at Stoichiometric A/F after 500 hrs. Engine Aging at 0.3 Lean of Stoichiometric Set Point

| Catalyst No. | Percent Conversion | | |
|---|---|---|---|
| | HC | CO | NO$_x$ |
| I | 95 | 90 | 75 |
| II | 91 | 62 | 55 |

By reference to Table I, it is immediately apparent that with respect to all pollutant gases, the TWC prepared by impregnating the Pt and Rh metals on separate alumina supports provided conversion performance which is superior (Catalyst I) as compared to a Pt-Rh TWC in which the metals were impregnated on the same support (Catalyst II).

EXAMPLE II

Catalyst III

One thousand (1,000) grams of substantially rare earth oxide-free gamma alumina (surface area 130 m$^2$/g), stabilized with 0.8% by weight barium oxide, was impregnated with an aqueous rhodium chloride solution, containing 3.67 grams of rhodium. The rhodium containing alumina was ball milled with water and acetic acid to form a slurry and then further treated with hydrogen sulfide at room temperature to fix the rhodium in place.

In a separate preparation, 2,000 grams of gamma alumina (surface area 130 m$^2$/g), stabilized with 20% by weight cerium oxide, was mixed with 686 grams of bulk cerium oxide powder (surface area 120 m$^2$/g). The combined powder was impregnated with an aqueous amine solubilized platinum hydroxide (H$_2$Pt(OH)$_6$) solution, containing 18.36 grams platinum and then ball milled with water and acetic acid to form a slurry.

The rhodium containing slurry and the platinum containing slurry were combined and well-mixed in a large container. Soluble zirconium acetate was added to form a final washcoat slurry suitable for coating monolithic substrates. When calcined, the zirconium acetate is converted to ZrO$_2$, which was present at 0.05 g/in$^3$ on the washcoated monolith. The resultant catalyst was 110 in$^3$ in volume and contained 0.034 Troy ounces of platinum and 0.0068 Troy ounces of rhodium.

Catalyst IV (Comparative TWC)

For purposes of contrast, a cerium stabilized alumina support containing 5% by weight of ceria was impregnated with solutions of platinum and rhodium salts to codeposit the metals on the support. The impregnated support was incorporated in a washcoat containing nickel oxide as the oxygen storage component and was applied to a 400 cell cordierite monolith. The resultant catalyst was 100 in$^3$ in volume, and the metal loading was 0.034 Troy ounces of platinum and 0.0068 Troy ounces of rhodium. Nickel oxide was present in an amount of 0.3 g/in$^3$.

Following the procedure of Example I, each of the monolith bodies prepared above was mounted in the exhaust system of a laboratory test engine and aged for 24 hours using an accelerated aging fuel containing 0.012 g Pb/gal. During the accelerated aging, the engine was operated at the stoichiometric set point for 92% of the time resulting in a catalyst inlet temperature of about 600° C. during that period. For 8% of the time, the engine was operated at +0.3 A/F units, i.e., fuel lean at A/F of 14.95 resulting in an inlet temperature to the catalyst of about 780° C. After aging, the TWC coated monoliths were evaluated in an engine dynamometer wherein the air-to-fuel ratio employed was fluctuated 1.0 A/F units above and below the stoichiometric set point at 1.0 Hz perturbations. The conditions used for the evaluations were at an inlet temperature of 400° C. and an exhaust gas flow rate of 80,000 VHSV. The catalytic efficiency at the above described conditions are summarized in Table II below.

TABLE II

Conversion Efficiency of TWC at Stoichiometric A/F After 24 Hours Engine Aging

| Catalyst No. | Percent Conversion | | |
|---|---|---|---|
| | HC | CO | NO$_x$ |
| III | 88 | 68 | 74 |
| IV | 84 | 34 | 64 |

By reference to Table II, it is immediately apparent that the TWC prepared in accordance with the present invention (Catalyst No. III) exhibited conversion performance substantially superior to that exhibited by the conventional TWC wherein the Pt and Rh metals were deposited on the ceria containing alumina support particles.

EXAMPLE III

A series of rhodium containing catalysts prepared on stabilized gamma alumina supports were prepared as follows:

Catalyst A

Four hundred grams of gamma alumina stabilized with 5% by weight ceria (surface area: 120 m$^2$/g) was impregnated with an aqueous rhodium nitrate solution containing 0.265 grams of rhodium metal. The wet powder water and acetic acid were combined and the admixture further ball milled to produce a slurry. A 40 cell cordierite monolithic carrier was then dipped into the ball milled slurry to coat it to a coating weight of 1.75 g/in$^2$. Excess slurry was blown off by compressed air, the monolith was dried at 175° C. to remove free water and then calcined at 450° C. to yield a finished catalyst having 2.0 g/ft$^3$ loading of rhodium on the monolith. A core 1.5" in diameter and 3" in length was cut and separated from the monolith.

Catalyst B

The procedure used to prepare Catalyst A was repeated with the exception that the alumina stabilized by 0.8% by weight of barium oxide was substituted for the ceria stabilized alumina.

Catalyst C

The procedure to prepare Catalyst A was repeated, except that 0.8% by weight barium oxide was additionally incorporated in the alumina support.

Catalyst D

The procedure used to prepare Catalyst B was repeated with the exception that 3.2% by weight rare earth oxides composed of 95% by weight La$_2$O$_3$ was additionally incorporated in the alumina support.

Following the procedure of Example I, each of the monolith cores prepared above was mounted in the exhaust system of a laboratory test engine and aged for 150 hours at a slightly lean A/F using an accelerating aging fuel containing 0.012 g Pb/gal. During aging, the A/F ratio was varied resulting in the catalyst inlet temperature being about 590° C. for 92% of the aging period and about 730° C. for 8% of the aging period. After aging, the rhodium coated monolith cores were evaluated in an engine dynamometer wherein the air-to-fuel ratio employed was fluctuated ±0.5 A/F units at 1.0 H$_z$ perturbations. The evaluations were at an inlet temperature of 470° C. and an exhaust gas flow rate of 80,000 VHSV. The catalytic efficiency at the above described conditions are summarized in Table III below.

TABLE III

Conversion Efficiencies of Catalysts A–D at Stoichiometric A/F after 150 Hours Engine Aging

| Catalyst | Stabilizer | Percent Conversion | | |
|---|---|---|---|---|
| | | HC | CO | NO$_x$ |
| A | CeO$_2$ | 41 | 26 | 40 |
| B | BaO | 68 | 58 | 66 |
| C | CeO$_2$/BaO | 51 | 45 | 60 |
| D | BaO/La$_2$O$_3$ | 56 | 53 | 61 |

By reference to Table III, it is immediately apparent that alumina combined with rare earth oxides (Catalysts A, C and D) used as supports for rhodium catalysts exhibit inferior performance when compared to barium oxide stabilized alumina supports thereby demonstrating the detrimental interaction between rhodium and rare earth oxides.

EXAMPLE IV

One hundred grams of high surface area (180 in$^2$/g) gamma alumina powder was impregnated with an aqueous rhodium nitrate solution to produce 0.165 weight percent metal loading on the powder. The wet powder was mixed with 300 grams gamma alumina (100 m$^2$/g) and then ball milled with water and acetic acid to produce a slurry. A 400 cell cordierite monolithic carrier was dipped into the ball milled slurry to coat it to a coating weight of 1.4 g/in$^2$. Excess slurry was blown off by compressed air, and the monolith was dried at 125° C. to remove free water, and then calcined at 450° C. to yield a finished catalyst having 1.0 g/ft$^3$ rhodium. A core 1" in diameter and 3" in length was cut from the monolith and thermally aged in a muffle furnace at 750° C. for 1 hour in air.

Catalyst F

The procedure used to prepare Catalyst E was repeated with the exception that the high surface area gamma alumina was heat treated at 1,000° C. for 2 hours to reduce its surface area to 100 m$^2$/g prior to impregnation with the rhodium nitrate. X-ray diffraction analysis revealed that a major proportion of the alumina exhibited characteristics of the delta structure and a minor proportion exhibited characteristics corresponding to the gamma and theta structures.

Catalyst G

The procedure used to prepare Catalyst F was repeated except that reduced surface area alumina powder was impregnated with 5% by weight ceria then heat treated at 500° C. to prepare a ceria activated alumina support.

Catalyst H

The procedure used to prepare catalyst G was repeated except 1% by weight $La_2O_3$ was substituted for the 5% ceria activating agent.

Each of the catalyst monolith bodies prepared above was mounted in the simulated exhaust stream of a laboratory test reactor, the exhaust gas containing 1.54% CO, 0.51% $H_2$, 0.99% $O_2$, 240 ppm $C_2H_4$, 160 ppm $C_3H_8$, 2,000 ppm $NO_x$, 10% $CO_2$, 10% $H_2O$, 20 ppm $SO_2$, the balance being $N_2$. The temperature of the exhaust gas was 112,000 VHSV and the air-to-fuel ratio employed was fluctuated ±0.5 A/F units at 0.5 $H_2$ perturbations. The efficiencies of the various catalysts at the above described conditions are summarized in Table IV below.

TABLE IV

Conversion Efficiency of Catalysts E–H at Stoichiometric A/F After One Hour Thermal Aging at 750° C.

| Catalyst | Stabilizer | Percent Conversion | | |
|---|---|---|---|---|
| | | HC | CO | $NO_x$ |
| E | None | 5 | 32 | 56 |
| F | None | 39 | 66 | 63 |
| G | $CeO_2$ | 24 | 58 | 62 |
| H | $La_2O_3$ | 7 | 36 | 56 |

By reference to Table IV, it is immediately apparent that thermal treatment of high surface area gamma alumina (Catalyst F) reduces the interaction between rhodium and the alumina (compare with Catalyst E in which high surface area alumina had not been thermally treated). Further, the data in Table IV demonstrates that the presence of a rare earth oxide in the alumina support upon which rhodium is dispersed (Catalysts G and H) reduces the efficiency of the catalyst (compare Catalyst F in which the alumina support is substantially free of rare earth oxide) again indicating the detrimental interaction between rhodium and the rare earth oxide.

EXAMPLE V

Catalyst I

A platinum containing barium oxide/alumina composite was prepared by impregnating 100 grams of alumina stabilized with 0.8% by weight BaO (surface area about 130 $m^2/g$) with an aqueous-amine solution containing 0.83 grams platinum as $H_2Pt(OH)_6$. The wet powder was mixed with 300 grams of an alumina stabilized with 20% ceria by weight (surface area about 120 $m^2/g$). The mixture was then ball milled with water and acetic acid to produce a slurry. A monolithic substrate was coated with the slurry following the procedure of Example IV to yield a coating weight of 1.4 $g/in^3$. After calcining at 450° C., the platinum catalyst was present on the monolith at a concentration of 5 $g/ft^3$ platinum.

A core 1.5" in diameter and 3" in length was cut from the monolith.

Catalyst J

The procedure used to prepare Catalyst I was used to prepare Catalyst J with the exception that 100 grams high surface area ceria (surface area about 120 $m^2/g$) was substituted for the BaO stabilized alumina powder.

Following the procedure of Example IV, each of the monolith cores prepared above was mounted on an exhaust system and aged 4 hours using an accelerated aging fuel containing 0.012 g Pb/gal. wherein the air-to-fuel ratio was maintained at stoichiometric for 92% of the time resulting in a catalyst inlet temperature of about 600° C. and at 0.3 A/F units lean of stoichiometric A/F for 8% of the aging period resulting in an inlet temperature of about 780° C. After aging, the platinum containing catalysts were evaluated in an engine dynamometer wherein the air-to-fuel ratio employed was fluctuated ±1.0 A/F units at 1.0 Hz perturbations. The evaluations were on an inlet temperature of 400° C. and an exhaust gas flow rate of 80,000 VHSV. The catalytic efficiencies at the above-described conditions are summarized in Table V below.

TABLE V

Conversion Efficiencies of Catalysts I–J at Stoichiometric A/F After 4 Hours Engine Aging at

| Catalyst | Percent Conversion | | |
|---|---|---|---|
| | HC | CO | $NO_x$ |
| I | 76 | 53 | 35 |
| J | 80 | 63 | 35 |

By reference to the data in Table V, it is immediately apparent that the platinum supported on high surface area ceria exhibits better hydrocarbon and carbon monoxide conversion than that of the platinum supported on BaO stabilized alumina particles.

EXAMPLE VI

One thousand grams of substantially rare earth oxide free gamma alumina (surface area 130 $m^2/g$) stabilized with 0.8% by weight barium oxide was ball milled with water and acetic acid to form a slurry. One hundred grams of aqueous rhodium chloride solution containing 3.2 grams rhodium metal was added to the slurry under constant agitation and then treated with hydrogen sulfide at room temperature to fix the rhodium in place. The rhodium containing slurry can be mixed with the platinum, palladium and ceria containing slurries, described in Examples I, II or V, in proper proportion to obtain a final TWC washcoat slurry to coat a monolith of desired precious metal loading.

EXAMPLE VII

In a series of runs, separate portions of 100 grams of gamma alumina slurry prepared in Example VI were impregnated with a series of aqueous rhodium chloride solutions containing varying amounts of rhodium ranging from 0.08 weight percent to 1.28 weight percent based on the combined weight of the alumina. The rhodium was fixed on the alumina with hydrogen sulfide which was bubbled through the slurry at room temperature in an amount equal to 20 moles of $H_2S$ per mole Rh treated. The resulting fixed rhodium was found to have a weighted average particle size of 32–77 Å diameter as determined by CO and hydrogen chemisorption. Analysis from transmission electron microscopic studies revealed that the resulting fixed rhodium was substantially greater than 20 Å and less than 100 Å in diameter.

Separate monolithic supports of cordierite containing about 400 flow passages per square inch of cross-section area were dipped into various members of the series of individual washcoat slurries containing dispersed therein uncoated alumina particles and the fixed rhodium/alumina particles. Excess slurry was blown off the monoliths and the monolith was dried to remove water and calcined at 450° C. in air for 1 hour to provide a 1 g/ft$^3$ rhodium metal loading on the monolith. A core 1.5" in diameter and 3" in length was cut and separated from each of the monoliths. The cores were then thermally aged in a muffle furnace at 740° C. for 70 hours in air.

Each of the catalyst monolith cores prepared above was mounted in a simulated exhaust stream of laboratory test reactor of the type employed in Example IV. The temperature of the exhaust gas was 400° C., the flow rate of the exhaust gas was 50,000 VHSV and the air-to-fuel ratio employed was fluctuated ±0.5 A/F units at 1.0 Hz perturbations. The efficiencies of the various loadings and weighted average particle sizes of the rhodium catalyst are summarized in Table VII below.

For purposes of contrast, 50 grams of the alumina powder described in Example VI was impregnated by mixing it in a mechanical mixer with varying concentrations of rhodium nitrate which had been dissolved in just enough water to completely saturate the powder (incipient wetness). The wet powder was placed in a forced air oven at 125° C. to remove the water. After drying and calcining at 450° C. in air for one hour, the resulting fixed rhodium was found to have an initial weighted average particle size range of 14 to 21 Å in diameter as determined by CO chemisorption. Transmission electron microscopic studies revealed that a substantial amount of rhodium was smaller than 30 Å in diameter as individual particles could not be clearly resolved. A washcoat slurry containing the comparative rhodium impregnated alumina particles was prepared by ball milling appropriate amount of alumina, water and acetic acid.

Monolithic cores washcoated with the comparative rhodium/alumina composition were calcined, aged and tested for conversion efficiency in the same manner as the hydrogen sulfide fixed rhodium/alumina composition were calcined, aged and tested for conversion efficiency in the same manner as the fixed hydrogen sulfide rhodium/alumina compositions of Example VII. These comparative compositions are designated by the symbols $C_1$–$C_3$. The efficiencies of these comparative compositions are also summarized in Table VII.

TABLE VII

Conversion Efficiencies of Alumina Supported Rhodium Metal Catalysts of Varying Particle Size

| Run Number | Weight % | Initial Weighted Average Particle Size, Å | Percent Conversion | | |
|---|---|---|---|---|---|
| | | | HC | CO | NO$_x$ |
| 1 | 0.08 | 32 | 44 | 54 | 66 |
| 2 | 0.16 | 48 | 65 | 51 | 60 |
| 3 | 0.32 | 73 | 72 | 58 | 63 |
| 4 | 0.64 | 77 | 82 | 58 | 63 |
| 5 | 0.96 | 68 | 53 | 54 | 69 |
| 6 | 1.28 | 63 | 48 | 54 | 68 |
| $C_1$ | 0.16 | 15 | 48 | 54 | 66 |
| $C_2$ | 0.64 | 16 | 30 | 47 | 63 |
| $C_3$ | 7.00 | 21 | 29 | 38 | 51 |

By reference to Table VII, it is immediately apparent that improved rhodium catalyst efficiencies are obtained with a weighted average particle size (determined by chemisorption) range between greater than 30 Å and 80 Å with optimal catalyst efficiencies being obtained at catalyst loadings of between 0.32 and about 1.0% by weight when the alumina particles are impregnated with the rhodium metal by bubbling H$_2$S through a continuous liquid phase in which the alumina particles are dispersed. Note in this regard, comparative runs $C_1$–$C_3$ wherein the continuous liquid phase was not present during the impregnation step with the result that rhodium particles of less than about 30 Å diameter size formed which thereafter exhibited an inferior performance of catalyst efficiency even with very high rhodium loadings.

While specific components of the present system are defined above, many other variables may be introduced which may in any way affect, enhance or otherwise improve the system of the present invention. These are intended to be included herein.

Although variations are shown in the present application, many modifications and ramifications will occur to those skilled in the art upon a reading of the present disclosure. These too are intended to be included herein.

We claim:

1. An improved three-way catalyst, suitable for simultaneously oxidizing both gaseous hydrocarbons and carbon monoxide while reducing nitrogen oxides, said catalyst comprising a washcoat comprising rhodium dispersed on particles of gamma alumina, an amount of a rare earth oxide effective for enhancing oxidation of carbon monoxide and a second platinum group metal selected from the group consisting of platinum, palladium and mixtures thereof, the second platinum group metal being dispersed on particles selected from the group consisting of particles of rare earth oxide, particles of alumina, particles of gamma alumina stabilized with rare earth oxide and mixtures thereof; wherein the improvement comprises a substantial portion of the rhodium being dispersed on particles which are substantially rare earth oxide free, said substantial portion of said rhodium being dispersed as crystallites having an initial particle size greater than about 2 nm.

2. The catalyst of claim 1 wherein the rhodium is incorporated therein at a concentration of about 0.1 g/ft$^3$ to about 15 g/ft$^3$ and the second platinum group metal is incorporated therein at a concentration of about 0.5 g/ft$^3$ to about 150 g/ft$^3$ based on the total volume of the catalyst.

3. The catalyst of claim 1 wherein the rhodium has an initial average particle size of at least about 30 Å in diameter as determined by chemisorption.

4. The catalyst of claim 1 wherein the rhodium has an initial average particle size of between about 35 Å and about 80 Å in diameter as determined by chemisorption.

5. The catalyst of claim 4 wherein the rhodium is incorporated therein at a concentration of about 0.05 to about 2.0 percent by weight based on the weight of the rhodium compound.

6. The catalyst of claim 1, wherein the amount of rare earth oxide is at least about 0.05% of the weight of the washcoat.

7. The catalyst of claim 1 wherein the second platinum group metal is dispersed on particles of gamma alumina.

8. The catalyst of claim 1 wherein the second platinum group metal is dispersed on alumina particles having a rare earth oxide combined therewith.

9. The catalyst of claim 8 wherein the rare earth metal oxide is combined with the alumina particles at a concentration of about 0.1 to about 25 percent by weight based on the weight of the combined alumina.

10. The catalyst of claim 9 wherein the rare earth metal oxide is cerium oxide.

11. The catalyst of claim 1 wherein the second platinum group metal is dispersed on particles of rare earth oxide.

12. The catalyst of claim 11 wherein the rare earth oxide is cerium oxide.

13. The catalyst of claim 1 wherein the rhodium is dispersed on alumina particles having an alkaline earth oxide combined therewith.

14. The catalyst of claim 13 wherein the second platinum group metal is dispersed on alumina particles having rare earth oxide combined therewith.

15. The catalyst of claim 13 wherein the second platinum group metal is dispersed on alumina particles having cerium oxide combined therewith.

16. The catalyst of claim 14 wherein the alkaline earth oxide is barium oxide.

17. The catalyst of claim 13 wherein the alkaline earth oxide is barium oxide.

18. The catalyst of claim 13 wherein the alkaline earth oxide is combined with alumina at a concentration of about 0.1 to about 3.0 percent by weight of the combined alumina.

19. The composition of claim 1 wherein the rhodium is dispersed on gamma alumina particles having an alkaline earth oxide combined therewith.

20. The composition of claim 19 wherein the alkaline earth oxide is barium oxide.

21. The composition of claim 19 wherein the alkaline earth oxide is combined with the alumina particles at a concentration of about 1.0 to about 3.0 percent by weight based on the combined weight of the alumina and alkaline earth metal oxide.

22. The catalyst of claim 1 wherein the rare earth oxide and the particles bearing the dispersed rhodium and second platinum group metal are distributed on a monolithic ceramic carrier.

23. The catalyst of claim 1 wherein there is additionally incorporated in the catalyst composition a promoter for oxidation and reduction reactions, the promoter being selected from the group consisting of manganese, vanadium, copper, iron, cobalt, chromium, zirconium, nickel and oxides thereof.

24. The composition of claim 23 wherein the promoter is incorporated therein at a concentration of about 0.5 to about 25 percent by weight based on the weight of the washcoat.

25. The catalyst of claim 1 wherein the rare earth oxide is present in an amount of at least about 3% by weight of the washcoat.

26. The catalyst of claim 1 wherein the rare earth oxide is present in an amount of at least about 5% by weight of the washcoat.

27. The catalyst of claim 1 wherein the rare earth oxide is present in an amount of at least about 10% by weight of the washcoat.

28. The catalyst of claim 1 wherein the rare earth oxide is present in an amount of at least about 15% by weight of the washcoat.

29. A three-way catalyst comprising rhodium, an amount of rare earth oxide effective for enhancing oxidation of carbon monoxide and a second platinum group metal selected from the group consisting of platinum, palladium and mixtures thereof, said catalyst being suitable for simultaneously oxidizing both gaseous hydrocarbons and carbon monoxide, while reducing nitrogen oxides and having been prepared by the method comprising forming a washcoat by the steps of:
impregnating substantially rare earth oxide free gamma alumina support particles with a liquid admixture containing a first platinum group metal composition selected from the group consisting of rhodium compounds, admixtures of rhodium compounds with platinum compounds and admixtures of rhodium compounds with palladium compounds and admixtures of rhodium compounds with platinum and palladium compounds, the impregnation conditions being controlled to deposit a substantial portion of said rhodium in said first platinum group metal composition as dispersed crystallites having an initial particle size greater than about 2 nm; impregnating support particles with a liquid admixture containing a second platinum group metal composition, said support particles being selected from the group consisting of particles of rare earth oxide, particles of alumina and particles of gamma alumina stabilized with rare earth oxide mixtures thereof, said second platinum group metal composition being selected from the group consisting of platinum compounds, palladium compounds and admixtures of platinum and palladium compounds;
combining the particles impregnated with said first platinum group metal composition with the particles impregnated with said second platinum group metal composition; and
drying and calcining.

30. The catalyst of claim 29 wherein the rhodium impregnated on the rare earth free alumina particles has an initial average particle size of at least about 35 Å but less than about 50 Å determined by chemisorption.

31. The catalyst of claim 29 wherein the rhodium impregnated on the rare earth free alumina particles has an initial average particle size of between about 35 Å and about 80 Å as determined by chemisorption.

32. The catalyst of claim 29 wherein the rhodium is incorporated therein at a concentration of about 0.05 to about 25 g/ft$^3$.

33. The catalyst of claim 29 wherein the alumina dispersed in a continuous phase liquid is impregnated with rhodium from an aqueous rhodium compound.

34. The catalyst of claim 33 wherein the rhodium is fixed on the alumina by incorporating a fixing agent in the continuous phase liquid.

35. The catalyst of claim 34 wherein the fixing agent is H$_2$S gas.

36. The three-way catalyst of claim 29 wherein said support particles impregnated with said second platinum group metal composition are particles selected from the group consisting of particles of alumina and particles of gamma alumina stabilized with rare earth oxide, wherein the process by which said three-way catalyst is prepared, comprises the further step of combining particles of rare earth oxide with the particles impregnated with said first platinum group metal composition and the particles impregnated with said second group metal composition.

37. The catalyst of claim 29 wherein the process by which said catalyst is prepared comprises the additional steps of suspending the impregnated alumina particles and the rare earth oxide in a liquid to form a slurry, contacting a monolithic carrier with the slurry, and heating the carrier at a temperature which is sufficiently high to provide on the carrier a composite of the rhodium, second platinum group metal, rare earth oxide and alumina particles.

38. The catalyst of claim 37 wherein the amount of rhodium impregnated on the alumina particles is from about 0.1 g/ft$^3$ to about 15 g/ft$^3$ and the second platinum group metal composition is impregnated on the second alumina particles at a concentration sufficient to provide a platinum group metal concentration of from about 0.5 g/ft$^3$ to about 150 g/ft$^3$ based on total volume of the catalyst.

39. The catalyst of claim 37 wherein the alumina upon which said first platinum group metal composition is impregnated is gamma alumina.

40. The catalyst of claim 29 wherein the second platinum group metal composition is dispersed on particles of rare earth oxide.

41. The catalyst of claim 40 wherein said rare earth oxide is cerium oxide.

42. The catalyst of claim 36 wherein the alumina upon which said second platinum group metal composition is dispersed has an alkaline earth oxide combined therewith.

43. The catalyst of claim 42 wherein the alkaline earth oxide is barium oxide.

44. The catalyst of claim 21 wherein the second platinum group metal is impregnated on alumina particles having a rare earth metal oxide combined therewith.

45. The catalyst of claim 44 wherein the rare earth metal oxide is combined with the alumina particles at a concentration of about 0.05 to about 30 percent by weight based on the weight of the composite.

46. The catalyst of claim 45 wherein the rare earth metal oxide is cerium oxide.

47. The catalyst of claim 29 wherein the second platinum group metal composition is impregnated on the alumina particles having a rare earth oxide combined therewith.

48. The catalyst of claim 47 wherein the rare earth oxide is cerium oxide.

49. The catalyst of claim 47 wherein the concentration at which said rare earth metal is combined with the alumina particles upon which said second platinum group metal compound is impregnated is from about 0.1 to about 3.0 percent by weight based on the weight of the combined alumina.

50. The catalyst of claim 49 wherein the rare earth metal is cerium.

51. The catalyst of claim 36 wherein the rhodium is impregnated on the alumina particles having an alkaline earth oxide combined therewith.

52. The catalyst of claim 51 wherein the alkaline earth oxide is barium oxide.

53. The catalyst of claim 51 wherein the alkaline earth oxide is combined with the alumina particles at concentrations of about 0.1 to about 3.0 percent by weight based on the combined weight of the alumina particles and alkaline earth metal oxide.

54. The catalyst of claim 29 wherein there is additionally incorporated in the washcoat a promoter for oxidation and reduction reactions, the promoter being selected from the group consisting of manganese, vanadium, copper, iron, cobalt, chromium, zirconium, nickel and oxides thereof.

55. The catalyst of claim 54 wherein the promoter is incorporated in the slurry at a concentration of about 0.5 to about 50 percent by weight based on the weight of the washcoat solids.

56. The catalyst of claim 54 wherein ceria is additionally incorporated in the slurry.

57. The catalyst of claim 29 wherein the rare earth oxide is present in an amount of at least about 3% by weight of the washcoat.

58. The catalyst of claim 29 wherein the rare earth oxide is present in an amount of at least about 5% by weight of the washcoat.

59. The catalyst of claim 29 wherein the rare earth oxide is present in an amount of at least about 10% by weight of the washcoat.

60. The catalyst of claim 29 wherein the rare earth oxide is present in an amount of at least about 15% by weight of the washcoat.

* * * * *